(12) United States Patent
Ogborn et al.

(10) Patent No.: US 10,489,841 B1
(45) Date of Patent: Nov. 26, 2019

(54) FULFILLMENT OPTION OPTIMIZATION

(71) Applicant: Amazon Technologies, Inc., Seattle, WA (US)

(72) Inventors: Kenneth Ryan Ogborn, Seattle, WA (US); Amy Elizabeth Baxter, Renton, WA (US); Uri Leshno, Seattle, WA (US); Nicholas Richard Wilson, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 913 days.

(21) Appl. No.: 15/079,826

(22) Filed: Mar. 24, 2016

(51) Int. Cl.
*G06Q 30/00* (2012.01)
*G06Q 30/06* (2012.01)

(52) U.S. Cl.
CPC .................. *G06Q 30/0629* (2013.01)

(58) Field of Classification Search
CPC .............................. G06Q 30/06–08
USPC ............................. 705/26.1–27.2
See application file for complete search history.

(56) References Cited

U.S. PATENT DOCUMENTS

| | | | | |
|---|---|---|---|---|
| 2004/0249723 | A1* | 12/2004 | Mayer | G06Q 30/0601 |
| | | | | 705/80 |
| 2006/0173749 | A1* | 8/2006 | Ward | G06Q 10/08 |
| | | | | 705/26.8 |
| 2009/0234722 | A1* | 9/2009 | Evevsky | G06Q 30/02 |
| | | | | 705/14.1 |

* cited by examiner

*Primary Examiner* — Ethan D Civan
(74) *Attorney, Agent, or Firm* — Thomas | Horstemeyer, LLP; Michael J. D'Aurelio; Jason M. Perilla

(57) ABSTRACT

The optimization of fulfillment option benefits is described. In one example, selected offers for items are assembled for a transaction. A fulfillment option benefit, such as a delivery or shipping benefit, is identified for a first one of the items. A system determines whether an offer for a second one of the items contributes to qualification for the same fulfillment option benefit. When the offer for the second item does not contribute, the system searches for any other second item offers that do contribute to qualification for the benefit. If multiple other offers are found, the system ranks the other offers to identify a preferred other offer for the second item. The system then calculates a difference between the originally-selected offer and the preferred offer for the second item and generates a qualification contribution notification that highlights the preferred other offer as contributing to the fulfillment option benefit.

20 Claims, 8 Drawing Sheets

FULFILLMENT OPTION OPTIMIZATION

BACKGROUND

Using computer-based storefront systems, individuals can browse among many thousands of items available for purchase using computers and computer networks. In some cases, the same item may be offered for sale by more than one seller or online retailer. Thus, individuals are often presented with many options to choose from when different online retailers present the same item for sale. Some online retailers may offer a lower price while others may offer lower-cost or free shipping. At the same time, certain online retailers present offers for the purchase of items with fulfillment option benefits, such as reduced shipping costs, but only for certain offers that meet the qualifications to receive such benefits.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
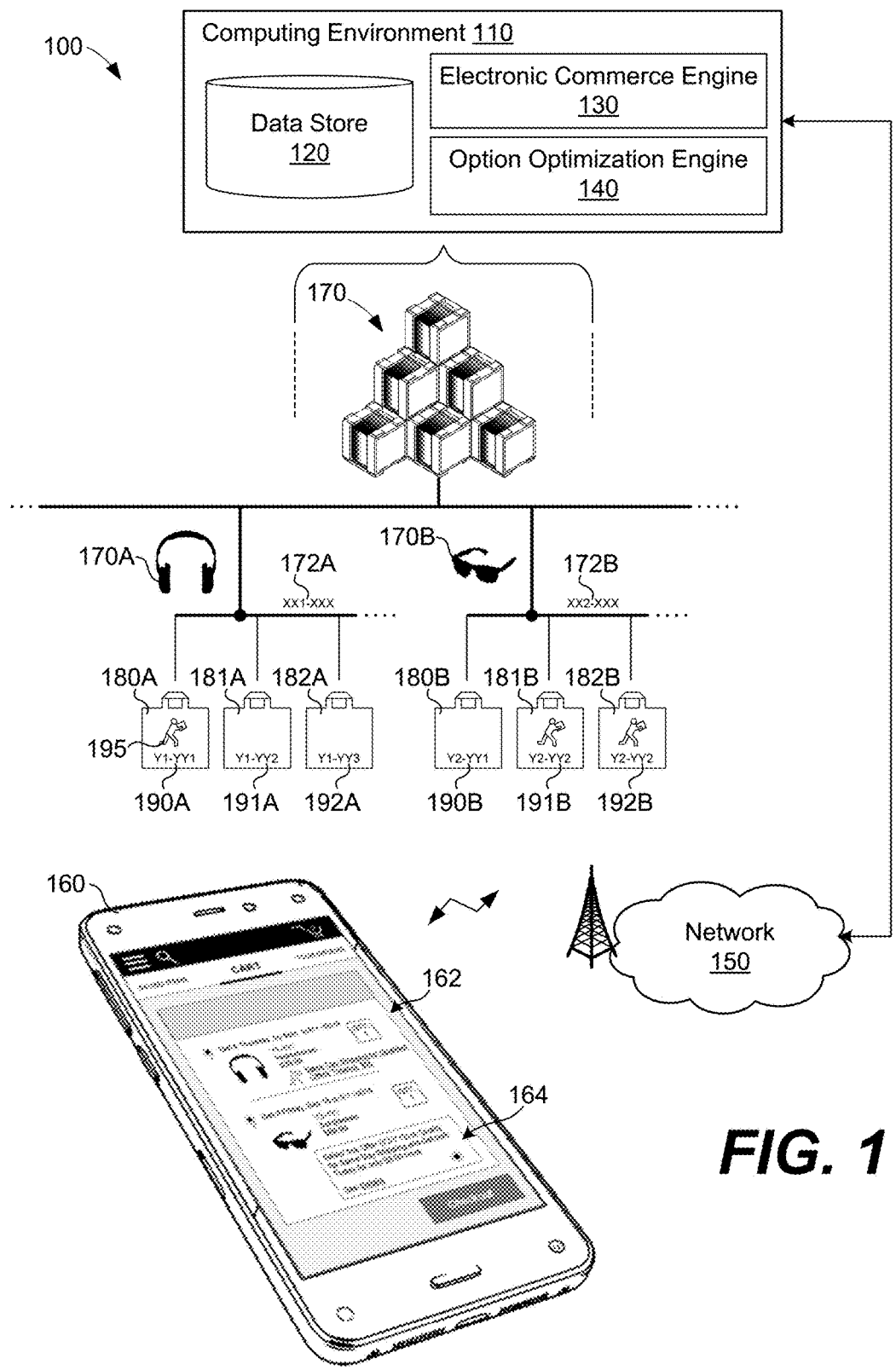
FIG. 1 illustrates a networked environment for fulfillment option optimization according to example embodiments described herein.

Individuals are often presented with many options to choose from when the same item is presented for sale from different online retailers in a multi-seller marketplace. When multiple offers for an item are available from one or more sellers, complexity is introduced into the analysis of search results. Some online retailers may offer a lower price as part of one offer while others may offer free shipping in another offer to purchase the same item. At the same time, certain online retailers present offers for the purchase of items with various fulfillment option benefits, such as reduced shipping costs, but only for certain offers that meet the qualifications to receive such benefits. Thus, for any individual item presented for sale on a site (or across sites), there can be many different offers for the item, each including different offer attributes, such as different prices, discounts, shipping costs, incentive programs, etc., and some of those offers may be combined in more than one way with other offers to unlock additional benefits.

Depending upon what offers are selected for purchase by an individual, he or she may not recognize that a first offer selected for a first item only partially contributes to a qualification threshold for a fulfillment option benefit, such as free shipping, while a first offer selected for a second item does not contribute to qualification for the benefit. Further, the individual may not have noticed that, among several offers for the second item, there was a second offer for the second item that contributes to qualification for the benefit. If the individual had selected the second offer for the second item, then the second offer for the second item could have been combined with the first offer for the first item to meet the qualification threshold for free shipping, saving overall costs for the transaction.

In the context outlined above, embodiments directed to the optimization of fulfillment option benefits are described herein. More particularly, the embodiments are directed to systems and processes that provide the analytic capability to review, rank, and notify users of various ways in which to optimize the selection of certain offers and/or combinations of offers. As one example, when several offers for various items are identified in a search for items, presented to a user through the display of a user interface, and selected for addition to an electronic shopping cart or other scratchpad of selected offers, a fulfillment option benefit is identified for a first one of the items in the shopping cart. The first one of the items may not by itself fully qualify for the fulfillment option benefit because a threshold cost or other benefit qualification threshold is not met by the first item.

If none of the other currently-selected offers in the shopping cart contribute to the benefit, a system determines whether other available offers for the items in the shopping cart do contribute to qualification for the fulfillment option benefit associated with the first item. For example, the system can search among other offers for the other items in the shopping cart to identify any that may contribute to qualification for the benefit. If multiple other offers are found that contribute to qualification for the benefit, the system can rank the other offers to identify a preferred offer to contribute to qualification for the benefit.

The system then calculates a difference between the originally-selected offers and the preferred other offers, in terms of cost or other attributes, and generates one or more qualification contribution notifications that highlight one or more of the preferred other offers as contributing to one or more the fulfillment option benefits. The qualification contribution notifications can also indicate differences in cost between the originally-selected offer and the preferred other offers so that an individual is able to make a reasoned decision as to whether he or she should select the other offers. A user can select one or more of the preferred other offers and, perhaps, qualify for fulfillment option benefits. In that way, the system can make suggestions as to certain offers which can be selected to qualify for and/or maximize various types of fulfillment option benefits provided by online retailers. Additionally, the search for other offers that may contribute to qualification for benefits can continue in the background over time.

To further explain the objects of the embodiments, FIG. 1 illustrates a networked environment 100 for fulfillment option optimization according to various example embodiments described herein. As shown, the networked environment 100 includes a computing environment 110 having a data store 120, an electronic commerce engine 130, and an option optimization engine 140. The networked environment 100 also includes a network 150 and a client device 160. As shown, the client device 160 is capable of network-based electronic communication with the computing environment 110 via the network 150. In FIG. 1, the client device 160 is illustrated as a smart phone, although the client device 160 can be embodied as other types of computing devices as described below.

As described in further detail below with reference to FIG. 2, the computing environment 110 hosts an electronic commerce system or marketplace in which various offers are presented for the sale of items using network pages, for example, generated by the computing environment 110. The network pages can be generated by the electronic commerce engine 130, forwarded to the client device 160 via the network 150, and rendered by the client device 160.

The electronic commerce engine 130 is configured to present offers for any of the items stored in a catalog of items 170, such as the items 170A and 170B, which are shown as headphones and sunglasses, respectively, in FIG. 1. The catalog of items 170 can be stored in the data store 120 along with other data relevant to the computing environment 110 as further described below. In the data store 120, the items 170A and 170B are associated with standard identification numbers 172A and 172B, respectively. The standard identification numbers 172A and 172B can be used by the electronic commerce engine 130 to uniquely identify the items 170A and 170B. In the electronic commerce marketplace hosted by the computing environment 110, each of the items 170A and 170B can be associated with multiple offers for sale. For example, as shown in FIG. 1, the item 170A is associated with the offers 180A-182A, among others. Similarly, the item 170B is associated with the offers 180B-182B, among others. Each of the offers 180A-182A and 180B-182B is associated with a unique offer identification number, respectively referenced as 190A-192A and 190B-192B in FIG. 1. The offers 180A-182A and 180B-182B can differ in various offer attributes, such as item price or cost, selling merchant, shipping merchant, shipping options, shipping cost, item condition (e.g., used, new, etc.), and other attributes.

The offers 180A-182A and 180B-182B can also differ in that certain ones can qualify for or can contribute to the qualification for one or more fulfillment option benefits. Examples of fulfillment option benefits include delivery timeframe benefits (e.g., same day, two day, etc.), a delivery option benefits (e.g., early morning, late evening, front-door, no signature required, etc. delivery), shipping service class benefits (e.g., courier, ground, air, etc. delivery), shipping cost reduction benefits (e.g., free or lower-cost shipping), packaging option benefits (e.g., free gift wrapping, frustration-free packaging, reinforced packaging, flat fee cost-per-container volume shipping, etc.), and other fulfillment option benefits. As shown in FIG. 1, the offers 180A, 181B, and 181C contribute to the qualification for a delivery timeframe benefit, designated by the delivery symbol at reference numeral 195.

Certain fulfillment option benefits, such as the delivery timeframe benefit 195 associated with the offers 180A, 181B, and 181C, are associated with qualification thresholds or requirements for the benefits to be unlocked or made available to individuals. For example, the delivery timeframe benefit 195 is made available when a threshold cost of $50 among items which qualify for the delivery timeframe benefit 195 is reached. Threshold requirements to qualify for benefits can also include subscription or membership requirements, order timing requirements, geographic-location requirements, and other requirements as further described below. Additionally, the qualification for one or more benefits can depend upon a combination of two or more requirements, such as minimum order threshold and membership subscription requirements.

Referring to the interface 162 presented on the client device 160 in FIG. 1, the offers 180A and 180B have been selected for a potential transaction with the electronic marketplace of the computing environment 110. The offer 180A contributes to qualification for a same day shipping benefit (an example delivery timeframe benefit 195), but the cost of the item 170A under the offer 180A (i.e., at $39.99) does not meet the threshold cost of $50 to qualify for the delivery timeframe benefit 195. At the same time, the offer 180B does not contribute to qualification for the delivery timeframe benefit 195 because the delivery timeframe benefit 195 is not an attribute or aspect of the offer 180B.

According to aspects of the embodiments, the option optimization engine 140 is configured to identify the failure of the offer 180A to fully qualify for the delivery timeframe benefit 195. The optimization engine 140 further searches for and presents one or more alternative offers which might unlock (or at least contribute to qualification for) the delivery timeframe benefit 195. As one example, the option optimization engine 140 is configured to suggest alternative offers for the item 170B, because the offer 180B does not contribute to the delivery timeframe benefit 195. In that context, the option optimization engine 140 is configured to search for or audit other offers for the item 170B in the electronic marketplace of the computing environment 110. As shown in FIG. 1, the offers 181B and 182B both contribute to qualification for the delivery timeframe benefit 195. Thus, based on a search through the available offers for the item 170B in the data store 120, for example, the option optimization engine 140 identifies the offers 181B and 182B as both contributing to qualification for the delivery timeframe benefit 195.

Further, the option optimization engine 140 is configured to select one of the offers 181B and 182B to present in the interface 162 on the client device 160 as an alternative offer to select for the delivery timeframe benefit 195. The option optimization engine 140 can rank the offers 181B and 182B based on a cost or other relevant attribute. In other words, the option optimization engine 140 can rank the offers 181B and 182B based on cost to determine which one is a lowest cost option, to find that the offer 181B is a lower cost option for purchase of the item 170B than the offer 182B.

In turn, the option optimization engine 140 calculates a difference between the offer 180B and 181B. In the example shown in FIG. 1, the offer 181B is priced at $3 more than the offer 180B for the purchase of the item 170B. Once the option optimization engine 140 has identified the offer 181B and the difference in cost between the offer 181B and the currently-selected offer 180B, the option optimization engine 140 generates and presents a notification 164 as part of the interface 162. The notification 164 is presented as a qualification contribution notification for the offer 181B. The notification 164 indicates that, by the selection of the offer 181B rather than the offer 180B, both the items 170A and 170B can qualify for the delivery timeframe benefit 195 and both can be shipped and delivered on the same day that the transaction is authorized. In the example provided above, the notification 164 also indicates the difference of $3 in cost between the offers 180B and 181B, so an individual is aware of the relevant differences between the offers and can determine whether to select the offer 181B in place of the offer 180B.

As described in further examples below, the option optimization engine 140 is configured to review orders pending for a transaction, such as orders added to an electronic shopping cart in an electronic commerce marketplace, for example, to determine whether an alternate selection of one or more offers for the same (or different) products or items would result in a more optimal qualification for certain fulfillment option benefits. The option optimization engine 140 is further configured to present various options for the selection of other offers, where appropriate, to result a more optimal use of fulfillment option benefits.

Figure 2:
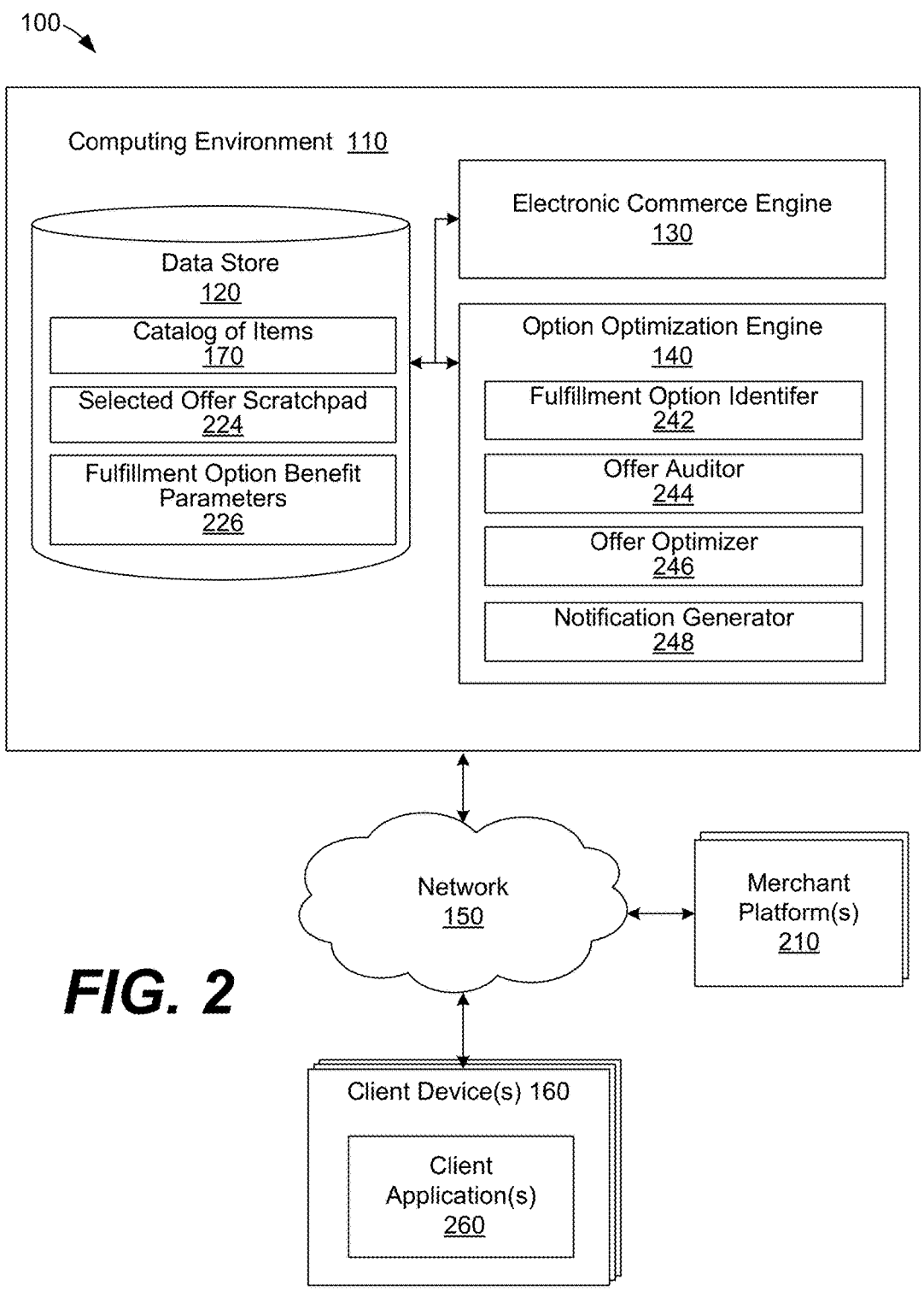
FIG. 2 illustrates a more detailed view of a computing environment for fulfillment option optimization shown in FIG. 1 according to example embodiments described herein.

FIG. 2 illustrates a more detailed view of the networked environment 100 for fulfillment option optimization shown in FIG. 1. In addition to the computing environment 110, network 150, and client device 160 shown in FIG. 1, the networked environment 100 also includes the merchant platform 210. FIG. 2 also illustrates memory areas for the catalog of items 170, the selected offer scratchpad 224, and the fulfillment option benefit parameters in the data store 120, and a fulfillment option identifier 242, offer auditor 244, offer optimizer 246, and notification generator 248 of the option optimization engine 140.

The computing environment 110 can be embodied as one or more computers, computing devices, or computing systems. In certain embodiments, the computing environment 110 can include one or more computing devices arranged, for example, in one or more server or computer banks. The computing device or devices can be located at a single installation site or distributed among different geographical locations. As further described below in connection with FIG. 7, the computing environment 110 can include a plurality of computing devices that together embody a hosted computing resource, a grid computing resource, and/or other distributed computing arrangement. In some cases, the computing environment 110 can be embodied as an elastic computing resource where an allotted capacity of processing, network, storage, or other computing-related resources vary over time.

The computing environment 110 can also be embodied, in part, as functional logic elements (e.g., executed computer-readable instructions, logic circuitry, processing circuitry, etc.) executed or operated by the computing environment 110 to direct it to perform aspects of the embodiments described herein. In that context, as illustrated in FIG. 2, the computing environment 110 includes the electronic commerce engine 130 and the fulfillment option identifier 242, offer auditor 244, offer optimizer 246, and notification generator 248 of the option optimization engine 140. The individual functions of the electronic commerce engine 130, fulfillment option identifier 242, offer auditor 244, offer optimizer 246, and notification generator 248 are described in further detail below.

The client device 160 is representative of one or more client devices. The client device 160 can be embodied as any computing device, processing circuit, or processor based device or system, including those embodied in the form of a desktop computer, a laptop computer, a personal digital assistant, a wearable computing device, a cellular telephone, or a tablet computer, among other example computing devices and systems. The client device 160 can include one or more subsystems and/or peripheral devices. For example, the peripheral devices may include one or more input devices, such as a keyboard, keypad, touch pad, touch screen, microphone, scanner, mouse, joystick, camera, one or more buttons, etc. The peripheral devices may also include a display, indicator lights, speakers, global navigation satellite system (GNSS) circuitry, accelerometer, or other components, depending upon the primary use of the client device 160.

As illustrated in FIG. 2, the client device 160 can execute various applications, such as the client application 260. In one embodiment, the client application 260 can be embodied as a browser application that receives and renders network pages generated by the computing environment 110 via the network 150. As one example, the client application 260 can be embodied as a hypertext-based internet browser or any other type of browser, without limitation. Alternatively, the client application 260 may comprise another type of application that interacts with the computing environment 110 using a suitable protocol via the network 150. Generally, when executed in the client device 160, the client application 260 renders network pages as they are served by the computing environment 110 over time to generate one or more user interfaces on a display of the client device 160.

The merchant platform 210 can be embodied as one or more computers, computing devices, or computing systems. In certain embodiments, the merchant platform 210 can be similar in composition to the computing environment 110, including one or more computing devices arranged, for example, in one or more server or computer banks. The merchant platform 210 can operate an electronic marketplace or storefront for one or more retailers. In that sense, the merchant platform 210 can store a catalog of items similar to the catalog of items 170 of the data store 120. Further, the merchant platform 210 can offer various products in that catalog for sale to the client device 160 through the presentation of offers for sale via the network 150. As described in further detail below, in some example cases, the option optimization engine 140 is configured to search for certain offers beyond those stored in the data store 120, such as those offered through the merchant platform 210.

The network 150 can include the Internet, intranets, extranets, wide area networks (WANs), local area networks (LANs), wired networks, wireless (e.g., cellular, 802.11-based (WiFi), bluetooth, etc.) networks, cable networks, satellite networks, other suitable networks, or any combinations thereof. The computing environment 110 can communicate with the client device 160 and the merchant platform 210 using various systems interconnect models and/or protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. Although not illustrated, the network 150 can include connections to any number of network hosts, such as website servers, file servers, networked computing resources, databases, data stores, or any other network or computing architectures.

Turning back to the computing environment 110, the catalog of items 170 includes a database of the items offered for sale through the electronic commerce marketplace of the electronic commerce engine 130 along with detailed information related to each item, such as each item name, cost, size (e.g., packaging volume), weight, expiration, manufacturer, etc. The catalog of items 170 can include any number and type of items, organized in any suitable fashion. The catalog of items 170 can include items presented for sale by various retailers or vendors and warehoused and shipped from various geographic locations, without limitation. In one embodiment, each item in the catalog of items 170 is associated with a standard identification number (SIN), such as the standard identification numbers 172A and 172B shown in FIG. 1. In some cases, an item can be associated with a parent SIN and variations on that item (e.g., different colors of the item) can be associated with children SINs. In some embodiments, in addition to items for sale, the catalog of items 170 can be expanded to include auctions, rentals, services, transportation and event tickets, and other tangibles and intangibles in available for trade in commerce.

In addition to storing a database of items for sale, the catalog of items 170 can include a listing of each offer available for each item, organized in any suitable fashion searchable by the option optimization engine. For example, as shown in FIG. 1, the item 170A is associated with the offers 180A-182A, and the item 170B is associated with the offers 180B-182B. Each of the offers 180A-182A and 180B-182B can be associated with a unique offer identification number, respectively referenced as 190A-192A and 190B-192B in FIG. 1.

The offers 180A-182A and 180B-182B can vary in certain attributes, such as item price or cost, selling merchant, shipping merchant, shipping options, shipping cost, item condition (e.g., used, new, etc.), and other attributes. Additionally, the offers 180A-182A and 180B-182B can also differ in that certain ones can qualify for or can contribute to the qualification for one or more fulfillment option benefits. Examples of fulfillment option benefits include delivery timeframe benefits (e.g., same day, two day, etc.), a delivery option benefits (e.g., early morning, late evening, front-door, no signature required, etc. delivery), shipping service class benefits (e.g., courier, ground, air, etc. delivery), shipping cost reduction benefits (e.g., free or lower-cost shipping), packaging option benefits (e.g., free gift wrapping, frustration-free packaging, reinforced packaging, flat fee cost-per-container volume shipping, etc.), and other fulfillment option benefits.

Using search string queries and/or by accessing organized listings of items by category, the electronic commerce engine 130 can search through and access the database of items in the catalog of items 170. In turn, the electronic commerce engine 130 can generate and serve up network pages for display on the client device 160 via the network 150. The network pages can include one or more offers, such as the offers 180A-182A and 180B-182B for the items 170A and 170B shown in FIG. 1 as well as any of the example offers shown in FIG. 3, among others.

The selected offer scratchpad 224 is a memory area reserved for the aggregation and organization of offers selected by an individual for a potential transaction with the electronic commerce marketplace of the electronic commerce engine 130. The offers can be browsed, examined, and selected for storage in the selected offer scratchpad 224 using the client device 160 as described herein. In one embodiment, the selected offer scratchpad 224 can be embodied as a type of electronic shopping cart memory area associated with a particular individual or user account of the individual, although the scope of the selected offer scratchpad 224 is not limited to an electronic shopping cart. Instead, the selected offer scratchpad 224 can be embodied as any memory area used to organize offers selected (or likely to be selected) by individuals for a potential transaction.

The fulfillment option benefit parameters 226 define the parameters or requirements of various fulfillment option benefits. For example, the fulfillment option benefit parameters 226 can define thresholds to qualify for certain benefits, such as threshold quantities, costs, volumes, weights, order frequencies, subscriptions, etc. As other examples, the fulfillment option benefit parameters 226 can specify delivery timeframes (e.g., same day, two day, etc.), delivery options (e.g., early morning, late evening, front-door, no signature required, etc. delivery), shipping service classes (e.g., courier, ground, air, etc. delivery), shipping cost reduction values, available packaging options, and other aspects of various benefits. As noted above, certain fulfillment option benefits are associated with qualification thresholds or requirements for the benefits to be unlocked or made available to individuals. Those thresholds or requirements are not limited to minimum order and/or cost requirements, however. Threshold requirements to qualify for benefits can also include subscription or membership requirements, order timing requirements, geographic-location requirements, and other requirements. Thus, threshold requirements can be unique to certain individuals for various reasons, such as their geographic location, subscription to a membership program, or other factors. Additionally, the qualification for benefits can depend upon a combination of two or more requirements, such as minimum order threshold and membership subscription requirements.

Turning to the components of the option optimization engine 140, the fulfillment option identifier 242 is configured to identify whether fulfillment option benefits are associated certain selected offers in the selected offer scratchpad 224 and/or in the catalog of items 170. The fulfillment option identifier 242 can examine the selected offers in the selected offer scratchpad 224 over time. As further described below, because the option optimization engine 140 is generally directed to the optimization of fulfillment option benefits, the process of optimization can be triggered by the identification of an offer associated with some type of fulfillment option benefits by the fulfillment option identifier 242.

The offer auditor 244 is configured to examine attributes or aspects of different offers for the same item, similar items, and/or different items to determine whether one or more alternate selections of offers for one or more items can be selected to meet qualification thresholds, for example, of certain fulfillment option benefits. The offer auditor 244 is configured to work with the offer optimizer 246 to ascertain the differences between the alternate selections of offers and present those differences to individuals. Especially in cases where offers for several items have been added to the selected offer scratchpad 224, the offer auditor 244 and the offer optimizer 246 can identify several alternate selections of offers. In that case, the offer optimizer 246 can rank the alternate selections of offers based on one or more factors to select one to present to an individual. The alternate selections of offers can be ranked based on highest value of unlocked fulfillment option benefit (e.g., in terms of reduced cost in items, reduced cost in shipping, etc.), greatest increase in shipping speed, best use of subscription services, or other factors.

The offer optimizer 246 is also configured to determine a difference in the current selection of offers in the selected offer scratchpad 224 and one or more of the alternate selections of offers. In some cases, the difference can amount to a benefit without any associated cost. For example, if an individual selected the offer 180B without same day shipping at a cost of the item 170B of $89.99 and failed to identify the offer 181B with free shipping at the same item cost, the offer optimizer 246 can identify that the same day shipping benefit can be obtained without any difference in item cost by selecting offer 181B rather than offer 180B. On the other hand, the offer 180A may be associated with higher item cost of $5 for the item 170A than the offer 181A, and the offer optimizer 246 can identify and calculate that difference in cost.

Once the offer auditor 244 and the offer optimizer 246 have identified an alternate selection of one or more offers and the difference between the current and alternate selections of offers, the notification generator 248 is configured to generate (or to invoke the generation of) a notification to present the proposed alternate selection. In FIG. 1, for example, the notification 164 is presented as a notification of the offer 181B as an alternative selection to the offer 180B. Particularly, the notification 164 indicates that, by the selection of the offer 181B rather than the offer 180B, both the items 170A and 170B can qualify for the delivery timeframe benefit 195 and both can be shipped and delivered on the same day. The notification 164 also indicates the difference of $3 in cost between the offers 180B and 181B.

Figure 3:
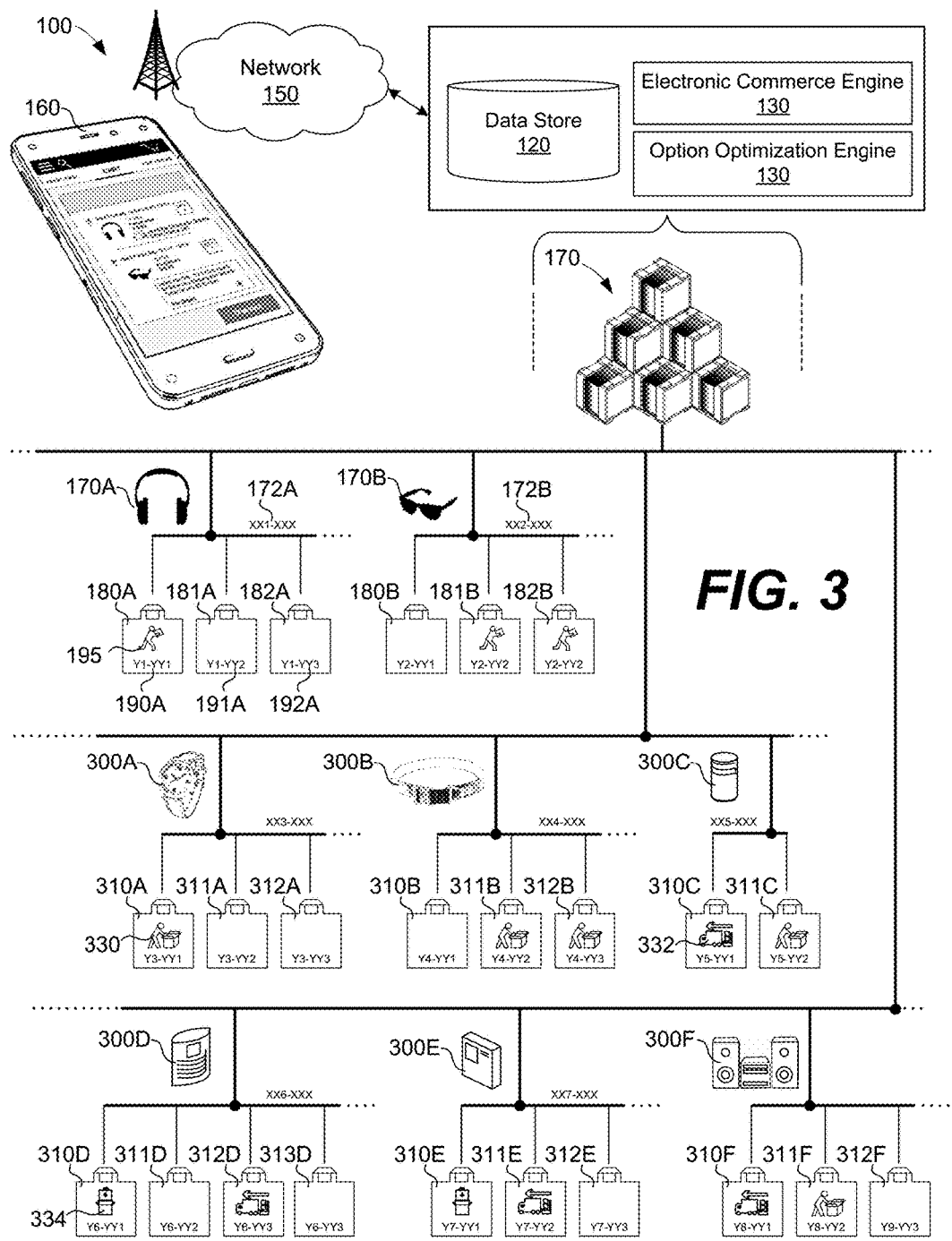
FIG. 3 illustrates examples of items and offers stored in the computing environment for fulfillment option optimization shown in FIG. 1 according to example embodiments described herein.

Turning to other examples, FIG. 3 illustrates other items and offers stored, referenced, and optimized for fulfillment benefits by the computing environment 110. As shown in FIG. 3, in addition to the items 170A and 170B, the catalog of items 170 includes the items 300A-300F among others. Among other offers that may be stored in the data store 120, the item 300A is associated with offers 310A-312A, the item 300B is associated with offers 310B-312B, the item 300C is associated with offers 310C and 311C, the item 300D is associated with offers 310D-313D, the item 300E is associated with offers 310E-312E, and the item 300F is associated with offers 310F-312F. Each of the offers 310A-312A, 310B-312B, 310C, 311C, 310D-313D, 310E-312E, and 310F-312F is associated with a unique offer identification number similar to the offer identification numbers 190A-192A of the offers 180A-182A, respectively.

As also shown in FIG. 3, certain ones of the offers 310A-312A, 310B-312B, 310C, 311C, 310D-313D, 310E-312E, and 310F-312F are associated with fulfillment option benefits. For example, the offers 310A and 311B are associated with a packaging option benefit designated by the packaging symbol at reference numeral 330. As another example, the offers 310C, 312D, 311E, and 310F are associated with shipping cost reduction benefits designated by the shipping symbol at reference numeral 332. Further, the offers 310D and 310E are associated with a flat fee cost-per-container shipping benefit designated by the container symbol at reference numeral 334.

Figure 4A:
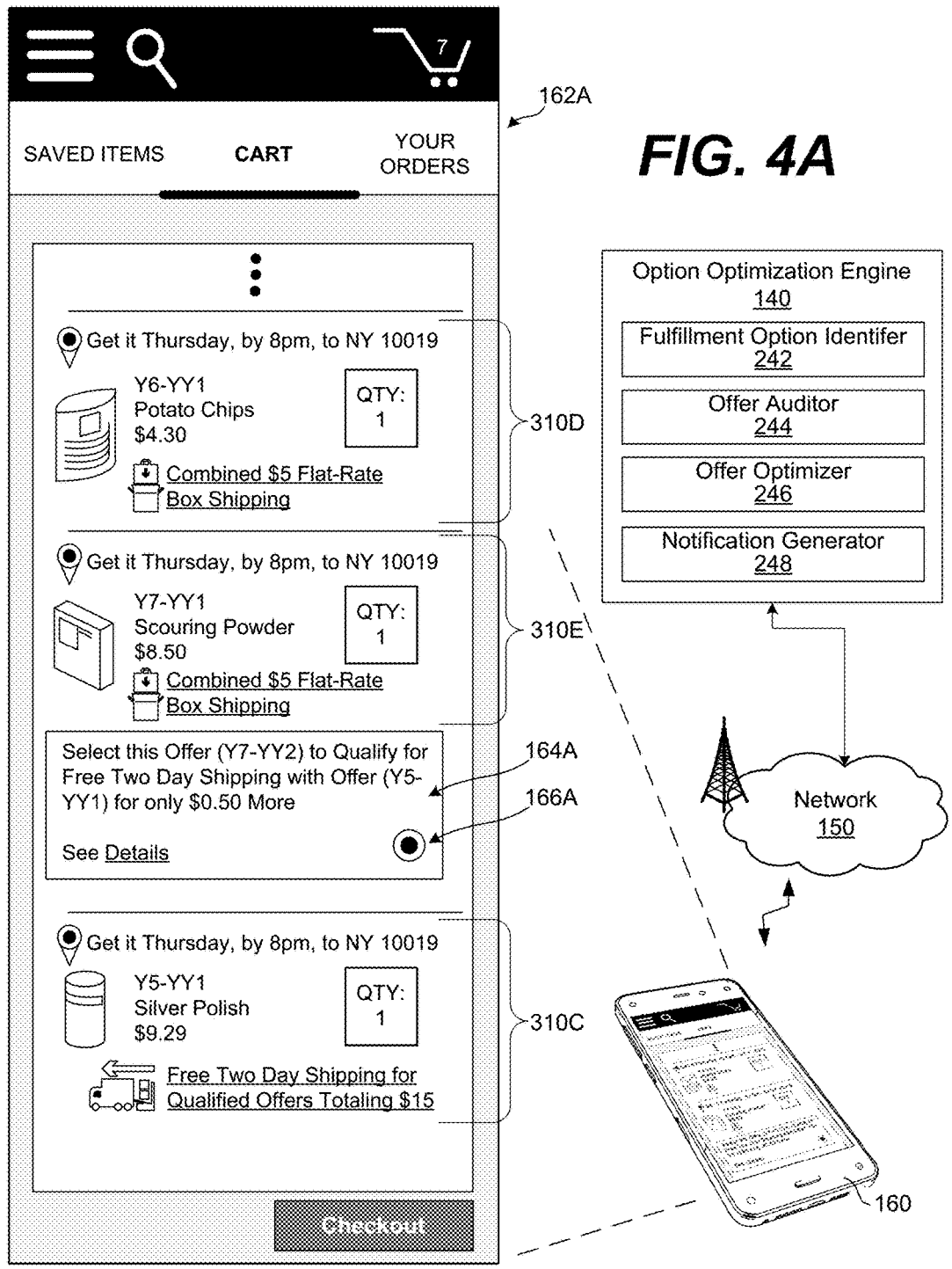
FIG. 4A illustrates an example user interface including a notification of alternative offers available for fulfillment option optimization.
Figure 4B:
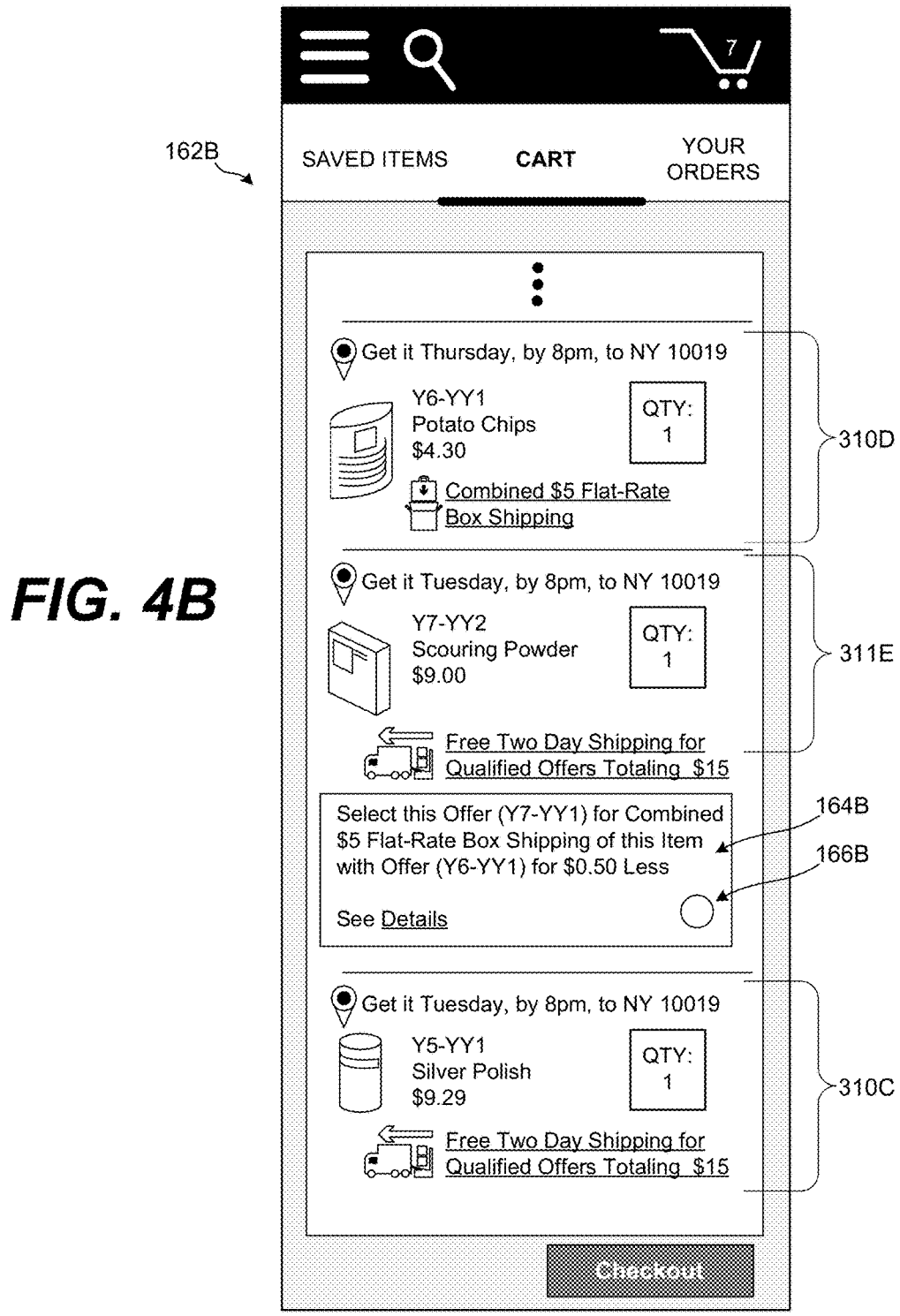
FIG. 4B illustrates another example user interface including a notification of alternative offers available for fulfillment option optimization.

The items, offers, and associated fulfillment option benefits illustrated in FIG. 3 are representative and provided by way of example. The catalog of items 170 in the data store 120 can include any number of additional and/or alternative items and any number of additional and/or alternative offers. Additionally, the fulfillment option benefits shown in FIG. 3 are not exhaustive, as other fulfillment option benefits associated with other offers are within the scope of the embodiments. FIGS. 4A and 4B refer back to the items, offers, and associated fulfillment option benefits illustrated in FIG. 3 to provide context to the discussion of the operation of the computing environment 110 in fulfillment option optimization.

FIG. 4A illustrates an example user interface 162A generated by the computing environment 110 including a notification 164A of alternative offers available for fulfillment option optimization. FIG. 4A is provided as one example of a user interface that can be relied upon to present notifications of alternative offers, but is not intended to be exhaustive or limiting because notifications can be presented in other ways. For example, as compared to the example shown in FIG. 4A, notifications can be presented in an interface separate from that used to show the currently-selected offers. Similarly, notifications can be presented through various channels, such as via e-mail, text message, or other channel of communications. In some cases, a notification may refer an individual to another network page for further examination of any alternative offers that have been identified by the option optimization engine 140.

In the example user interface 162A, seven offers for items have been added to an electronic shopping cart, and three of those offers are shown. Particularly, the offers 310D, 310E, and 310C have been selected and are shown in the user interface 162A. The offers 310D and 310E are both associated with the flat fee cost-per-container shipping benefit designated by the container symbol at reference numeral 334 in FIG. 3. The flat fee cost-per-container shipping benefit 334 permits an individual to pay a flat fee for shipping as many items that will fit within a box of a certain size for one flat fee. At the same time, none of the offers for the item 300C can be applied to the flat fee cost-per-container shipping benefit 334. Thus, the offer 310C for the item 300C cannot be paired with the flat fee cost-per-container shipping benefit 334 along with the offers 310D and 310E. Instead, the offer 310C is associated with a shipping cost reduction benefit designated by the shipping symbol at reference numeral 332. As shown in FIG. 4A, the shipping cost reduction benefit designated at reference numeral 332 includes a threshold parameter that a total cost of items under the benefit must total at least $15 to unlock the benefit. Currently, the shipping cost reduction benefit 332 is not available because the offer 310C for the item 300C totals only $9.29.

Based on the selected offers shown in FIG. 4A, the fulfillment option identifier 242 of the option optimization engine 140 (of the computing environment 110 shown in FIG. 2) is configured to identify the failure of the offer 310C to fully qualify for the shipping cost reduction benefit 332. Particularly, the fulfillment option identifier 242 identifies that the cost of the item 300C under the offer 310C, at $9.29, does not meet the $15 threshold to unlock the benefit. At the same time, the offers 310D and 310E do not contribute to qualification for the shipping cost reduction benefit 332. Based on that finding, the fulfillment option identifier 242 prompts the offer auditor 244 to search for any other offers associated with the items 300D and/or 300E that do contribute to qualification for the shipping cost reduction benefit 332.

In turn, the offer auditor 244 searches through or audits the catalog of items 170 (FIG. 3) to identify the other offers 311D-313D of the item 300D and the other offers 311E and 312E of the item 300E. The offer auditor 244 also audits the parameters of the other offers 311D-313D, 311E, and 312E to determine whether any of them contribute to qualification for the shipping cost reduction benefit 332. Consistent with the example offers shown in FIG. 3, the offer 312D of the item 300D and the offer 311E of the item 300E both contribute to qualification for the shipping cost reduction benefit 332. In some embodiments, the offer auditor 244 can additionally or alternatively search through a catalog of items stored in the merchant platform 210 to identify other offers that can contribute to qualification for the shipping cost reduction benefit 332. In that sense, the option optimization engine 140 is not limited to working with the offers presented by the electronic commerce marketplace provided by the computing environment 110. Instead, the option optimization engine 140 can work across platforms of various retailers or vendors via the network 150.

Once the other offers 312D and 311E are have been identified by the offer auditor 244 as potential contributors to qualification for the shipping cost reduction benefit 332, the offer optimizer 246 ranks or otherwise determines which one (or more—if any) of the offers 312D and 311E would be a relatively better alternate offer for selection. In this case, because the cost of the item 300D under the offer 312D is only $4.30, the selection of the offer 312D would not, by itself, be sufficient to meet the $15 threshold to unlock the shipping cost reduction benefit 332 even if combined with the offer 310C. Thus, the offer optimizer 246 determines that the offer 311E would be a better offer to pair with the offer 310C to qualify for the shipping cost reduction benefit 332.

Depending upon which offers have been selected by an individual for a potential transaction and also which alternative offers have been identified as being available by the offer auditor 244, the offer optimizer 246 can rank the alternative offers based on various factors which optimize the fulfillment benefits, reduce overall costs for the transaction, maximize shipping speed, reduce shipping costs, or other factors. As one example, the offer optimizer 246 can rank alternative offers to qualify for as many fulfillment options as possible using the least number of offers. As another example, the offer optimizer 246 can rank alternative offers based on a history of transactions or known preferences of certain individuals, such as an individual's preference for reduced cost or same day shipping.

As still another example, if both the offers 312D and 311E were associated with item costs high enough to unlock the shipping cost reduction benefit 332 when combined with the offer 310C, the offer optimizer 246 can select the offer 312D as a better alternative than the offer 311E because the item 300D occupies a greater volume than the item 300E in the container selected for the flat fee cost-per-container shipping benefit 334. In other words, by proposing a selection of the offer 312D rather than the offer 311E, a greater amount of space in the flat fee shipping container can be gained if the offer 312D is selected rather than the offer 310D. In that case, an individual can make greater use of the remaining flat fee cost-per-container shipping benefit 334 associated with the other selected offers in a transaction.

In some cases, however, even though one or more alternative offers may contribute to qualification for a benefit, the differences between a currently-selected offer and an alternate offer may be to the overall disadvantage to an individual. For example, an alternate offer that, when selected along with one or more other offers to qualify for free shipping of various items, may increase the total cost of the transaction so much that it would be more expensive to select the alternate offer. The offer optimizer 246 is configured to identify those types of situations and balance the qualification for fulfillment benefits against competing costs and concerns.

Referring back to the example shown in FIG. 4A, once the offer optimizer 246 selects the offer 311E to present as an alternative offer for selection with the offer 310C, the offer optimizer 246 calculates a difference between the offer 311E and the currently-selected offer 310E. As shown in FIG. 4A, the offer 311E is priced at $0.50 more than the offer 310E for the purchase of the item 300E. In turn, the notification generator 248 generates and presents a notification 164A in the interface 162A. The notification 164A indicates that, by the selection of the offer 311E rather than the offer 310E, the items 300C and 300E can both be shipped for free and delivered earlier than the items that qualify for the flat fee cost-per-container shipping benefit 334. In the user interface 162A, the offer 311E can be selected in place of the offer 310E using the user interface element 166A, which is provided as an example user interface element in FIG. 4A.

FIG. 4B illustrates another example user interface 162B including a notification 164B of alternative offers available for fulfillment option optimization. The user interface 162B can be generated by the computing environment 110 after an individual selects the user interface element 166A in FIG. 4A to replace the offer 310E with the offer 311E. Thus, the user interface 162B shows a selection of the offers 310D, 311E, and 310C. Here, the offer 310D is associated with the flat fee cost-per-container shipping benefit 334 along with other ones (not shown) of the seven selected offers in the transaction. Additionally, the offers 311E and 310C are associated with the shipping cost reduction benefit 332 and, combined, meet the $15 threshold to unlock the benefit 332. Thus, the user interface 162B now shows that both the items 300C and 300E can be received earlier, on Tuesday rather than Thursday, by way of qualification for the shipping cost reduction benefit 332.

At the same time, the option optimization engine 140 generates the notification 164B. The notification 164B is the corollary to the notification 164A and indicates that the offer 310E can be selected rather than the offer 311E to have the item 300E shipped under the flat fee cost-per-container shipping benefit 334 for $0.50 less. The offer 310E can be selected rather than the offer 311E using the user interface element 166B. The fulfillment option identifier 242, offer auditor 244, offer optimizer 246, and notification generator 248 can identify the offer 310E as an alternate to the offer 311E and generate the notification 164B in a manner similar (but a corollary) to that described above with reference to the notification 164A for the offer 311E.

In other examples, the option optimization engine 140 can identify several alternative offers and present them together as a batch of offers. In that case, the option optimization engine 140 can present the batch of offers in an interface similar to one of the user interfaces 162A or 162B or in another type of interface directed more particularly to the selection of among various offers. Further, the option optimization engine 140 can present other user interface elements to undo or revert the selection of alternative offers, to arrive back at a set of originally-selected offers.

In other aspects of the embodiments, the option optimization engine 140 can operate in the background to present new combinations of offers as they vary over time. For example, after an individual selects a number of offers for a potential transaction and those offers are stored in the selected offer scratchpad 224, the option optimization engine 140 can monitor for changes to the offers available in the catalog of items 170. Changes to the offers in the catalog of items 170 can include the addition of offers, the removal of offers, item cost changes in offers, fulfillment option benefit changes associated with offers, and other changes to various offer attributes. Based on such changes in available offers, the option optimization engine 140 can re-audit the offers in the catalog of items 170, compare them with those in the selected offer scratchpad 224, and present new combinations of offers that may be of interest. That process can continue in the background at any time after the individual has selected the offers for a potential transaction but before authorization of the transaction.

Figure 5:
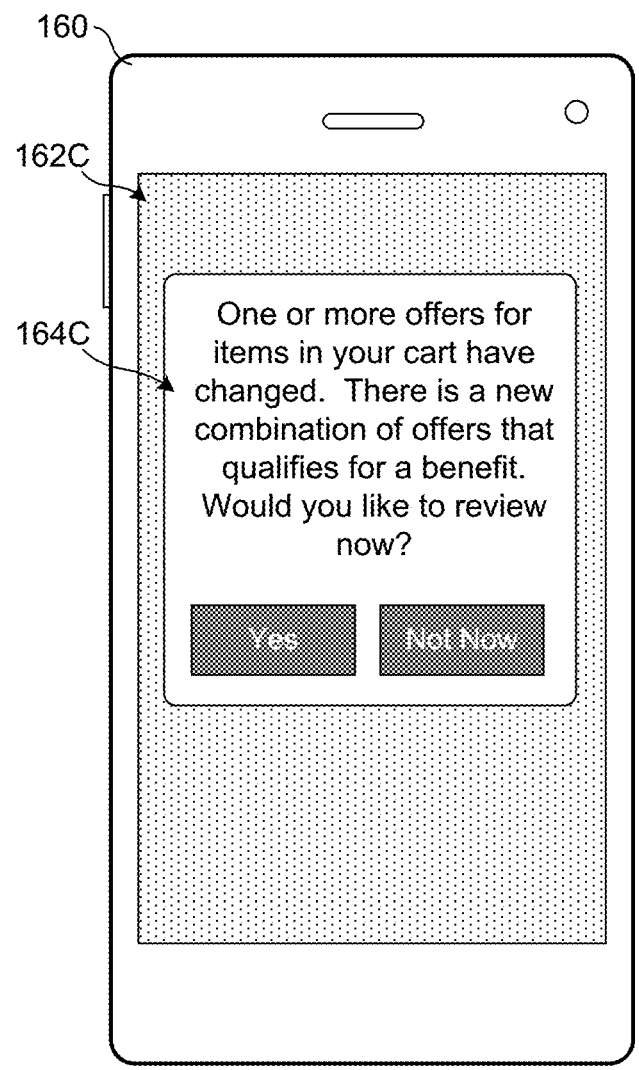
FIG. 5 illustrates another example user interface including an updated offer notification according to example embodiments described herein.

In the context of the background optimization presented above, FIG. 5 illustrates another example user interface 162C including an updated offer notification 164C. The updated offer notification 164C can be presented through an application executing in the background on the client device 160, for example, using an application programming interface call or hook into the operating system of the client device 160. Thus, even after an individual has selected a number of offers for a potential transaction and stored those offers in the selected offer scratchpad 224, the option optimization engine 140 can re-audit the offers in the catalog of items 170, compare them with those in the selected offer scratchpad 224, and identify new combinations of offers that may be of interest. Once one or more new combinations of offers have been identified by the option optimization engine 140, it can prompt a notification to the operating system of the client device 160 to display the updated offer notification 164C on the client device 160.

The user interfaces 162A, 162B, and 162C, the notifications 164A, 164B, and 164C, and the user interface elements 166A and 166B shown in FIGS. 4A, 4B, and 5 are provided by way of example any other suitable interfaces, interface notifications, and interface elements can be relied upon and displayed on various devices among the embodiments.

Figure 6:
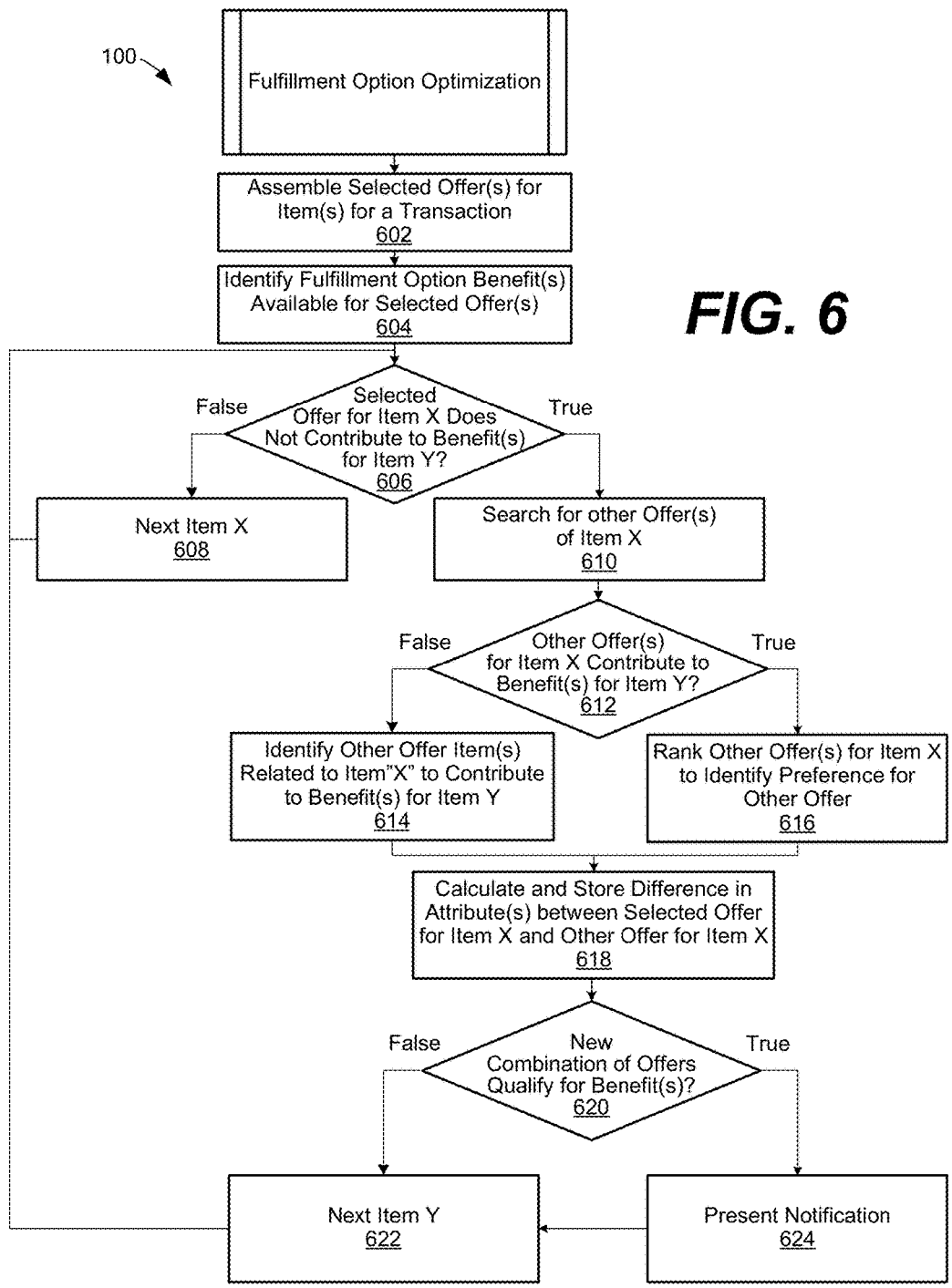
FIG. 6 illustrates a process of fulfillment option optimization performed by the computing environment shown in FIG. 2 according to various example embodiments described herein.

In the context of the examples provided above, FIG. 6 illustrates a process of fulfillment option optimization performed by the computing environment 110 shown in FIG. 2. In certain aspects, the process flowchart in FIG. 6 can be viewed as depicting an example set of steps performed by the computing environment 110. The flowchart in FIG. 6 provides merely one example of a functional sequence or arrangement of steps that can be employed to implement the aspects of fulfillment option optimization described herein. Further, although the process is described in connection with the computing environment 110, other computing environments, systems, and/or devices can perform the process.

At reference numeral 602, the process includes the computing environment 110 assembling one or more offers together for a potential transaction. For example, the electronic commerce engine 130 can generate one or more network pages for display on the client device 160 to permit an individual to browse through offers for items in the catalog of items 170, and the user can select one or more of those offers for a potential transaction. The selected offers, such as the offer 310A of the item 300A, the offer 310B of the item 300B, and the offer 311C of the item 300C in FIG. 3, for example, can be added to the selected offer scratchpad 224 for further processing. It is noted that, although the offers 310A, 310B, and 311C are referenced below for context, the process is not limited to any particular offers.

At reference numeral 604, the process includes the fulfillment option identifier 242 identifying any fulfillment option benefits for which the offers assembled at reference numeral 602 are associated with, qualify for, or contribute to qualification for. Here, the fulfillment option identifier 242 seeks to identify whether any of the selected offers are associated with fulfillment option benefits that can be optimized with other offers or combinations of offers as described herein. If none of the offers are associated with a fulfillment option benefit, the option optimization engine 140 can determine whether other offers for the same items are associated with a fulfillment option benefit.

Assuming that the fulfillment option identifier 242 identifies one or more fulfillment option benefits associated with one or more offers at reference numeral 604, the process proceeds to an iterative process of optimizing or exploring variations of those benefits based on the selection of alternate offers. The iterative process includes comparing other offers for items in the catalog of items 170 to determine whether other combinations of the offers present a different qualifying circumstance of benefits of greater interest (or benefit) to an individual.

As a starting point, at reference numeral 606, the process includes the offer auditor 244 determining whether a selected offer for any given item "X" fails to contribute (or does contribute) to qualification for a fulfillment option benefit for another item "Y". As an example, the offer auditor 244 can determine that the offer 311C of the "X" item 300C contributes to the qualification for the packaging option benefit 330 of the "Y" item 300A. In that case, the process proceeds to reference numeral 608 and back to reference numeral 606 to determine whether an offer for the next "X" item 300B fails to contribute (or does contribute) to qualification for the fulfillment option benefit for the "Y" item 300A. In other words, at some point in the iterative process (e.g., when item "X" is the item 300B in FIG. 3), the offer auditor 244 can determine that the selected offer 310B does not contribute to qualification for the packaging option benefit 330 of the offer 310A of the "Y" item 300A. In that case, the process proceeds to reference numeral 610.

The determination or comparison at reference numeral 606 can also be made between combinations of one or more offers and other groups of offers. For example, in addition to simply determining whether one offer for item "X" fails to contribute (or does contribute) to qualification for a benefit along with one offer for item "Y", the embodiments include determining whether a combination of offers for items "X1" and "X2" fail to contribute (or do contribute) to qualification for a benefit along with a combination of offers for items "Y1" and "Y2". Thus, while the process flow diagram in FIG. 6 is primarily described in the context of the comparison of offers individually, the process is not limited to an analysis of offers individually. Instead, the concepts described herein can apply similarly to the identification of combinations of different offers to maximize the qualification for various benefits.

Referring again to FIG. 6, at reference numeral 610, the process includes the offer auditor 244 searching for other offers of the item "X". For example, the offer auditor 244 can identify the other offers 311B and 312B of the item 300B. However, in some cases, no other offers maybe identified at reference numeral 610.

At reference numeral 612, the process includes the offer auditor 244 determining whether any of the offers identified at reference numeral 610 contribute to qualification for the fulfillment option benefit of the item "Y". If not, the process proceeds to reference numeral 614. Otherwise, the process proceeds to reference numeral 616.

At reference numeral 614, the process includes the offer auditor 244 identifying other offers for items related to the item "X" that contribute to qualification for the fulfillment option benefit of the item "Y". For example, if it is determined at reference numeral 610 that there are no other offers for the item "X" that contribute to qualification for the benefit for item "Y", the offer auditor 244 is capable of crossing certain item (e.g., SIN) boundaries in the item tree of the catalog of items 170 to find other offers for other items besides item "X". The offer auditor 244 can search through offers for items having an associated parent/child SIN relationship, such as phone cases of different colors. The offer auditor 244 can also search through offers for other items in the same product category as the item "X", such as other brands of running shoes if the item "X" is a running shoe. Generally, the process at reference numeral 614 can be provided to expand the number of possible items among which offers can be identified to contribute to qualification for the fulfillment option benefit of the item "Y", although it may be omitted in some embodiments.

At reference numeral 616, the process includes the offer optimizer 246 ranking any offers identified at reference numeral 612 as contributing to qualification for the fulfillment option benefit of the item "Y". The offer optimizer 246 can rank the offers based on one or more factors, such as highest value of unlocked fulfillment option benefit (e.g., in terms of reduced cost in items, reduced cost in shipping, etc.), greatest increase in shipping speed, best use of subscription services, or other factors described herein. As one example, given that the alternate offers 311B and 312B of the item 300B both contribute to qualification for the packaging option benefit 330 of the "Y" item 300A, the offer optimizer 246 can rank the offer 311B higher than the offer 312B if the cost of the item 300B is lower in the offer 311B than in the offer 311B. Alternatively, the offer optimizer 246 can rank the offer 312B higher than the offer 311B, although the cost of the item 300B in the offer 312B if that higher cost is necessary to combine with the offer 310A of the item 300A to unlock the packaging option benefit 330.

At reference numeral 618, the process includes the offer optimizer 246 calculating a difference between the originally-selected offer for item "X" and the other identified offer (e.g., the highest-ranked or otherwise selected offer) from reference numerals 614 and/or 616. The difference can be calculated in terms of one or more offer attributes, such as item price or cost, selling merchant, shipping merchant, shipping options, shipping cost, item condition (e.g., used, new, etc.), and other attributes.

At reference numeral 618, the offer optimizer 246 can also determine whether the differences between an originally-selected offer and the highest-ranked offer may be to the overall disadvantage to an individual. For example, in some cases, an alternate offer may increase the total cost of a transaction (e.g., when considering various factors such as item costs, shipping costs, shipping times, etc.) so much that the benefit is clearly outweighed by the additional cost. In that case, the offer optimizer 246 is configured to balance any benefits obtained through qualification for a benefit against competing costs of selecting alternative offers. In that context, the offer optimizer 246 can also use cost/benefit thresholds to make a decision as to whether or not to even present a notification, at all, at reference numeral 624, for example.

At reference numeral 620, the process includes the option optimization engine 140 determining whether it has found a new combination of offers that qualifies for a fulfillment option benefit. For example, the option optimization engine 140 can determine whether the offer identified at reference numerals 614 and/or 616 (e.g., one of the offers 311B or 312B) qualifies for the packaging option benefit 330 along with the item 300A. If not, then the process proceeds to reference numeral 622. In that case, the option optimization engine 140 may recognize that the offers both contribute to qualification for the packaging option benefit 330 but do not, even when selected together, fully qualify for it. In that case, the option optimization engine 140 can proceed back through the process to identify additional offers to combine in a larger group of offers for qualification.

On the other hand, of the option optimization engine 140 determines at reference numeral 620 that it has found a new combination of offers that does qualifies for a fulfillment option benefit, the process proceeds to reference numeral 624. At reference numeral 624, the process includes the notification generator 248 generating a qualification contribution notification for the other offer identified at reference numerals 614 and/or 616 along with an indication of the difference calculated at reference numeral 618. The notification can be presented on a client device similar to the client device 160 in any suitable manner consistent with the concepts described herein. Then, the process proceeds to reference numeral 622 to examine the next item "Y", and the process proceeds back to reference numeral 606.

Figure 7:
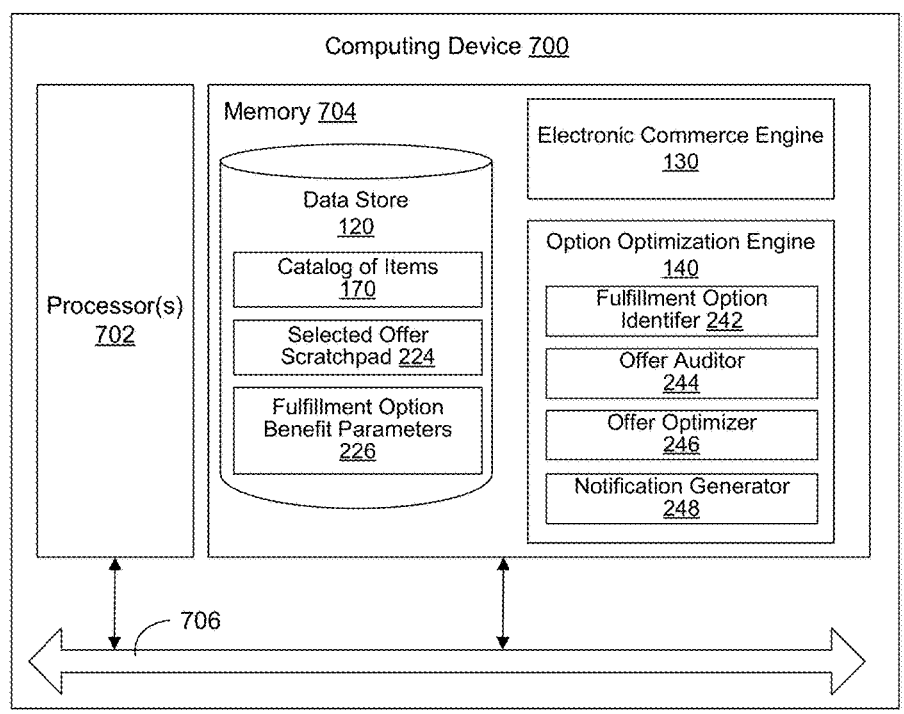
FIG. 7 illustrates an example schematic block diagram of a computing device for the computing environment shown in FIG. 2 according to various embodiments described herein.

FIG. 7 illustrates an example schematic block diagram of a computing device 700 embodiment example of the computing environment 110 shown FIG. 2 according to various embodiments described herein. The computing device 700 includes at least one processing system, for example, having a processor 702 and a memory 704, both of which are electrically and communicatively coupled to a local interface 706. The local interface 706 can be embodied as a data bus with an accompanying address/control bus or other addressing, control, and/or command lines.

In various embodiments, the memory 704 stores data and software or executable-code components executable by the processor 702. For example, the memory 704 can store executable-code components associated with the electronic commerce engine 130 and/or the option optimization engine 140 for execution by the processor 702. The memory 704 can also store data such as that stored in the data store 120, among other data.

It is noted that the memory 704 can store other executable-code components for execution by the processor 702. For example, an operating system can be stored in the memory 704 for execution by the processor 702. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 704 stores software for execution by the processor 702. In this respect, the terms "executable" or "for execution" refer to software forms that can ultimately be run or executed by the processor 702, whether in source, object, machine, or other form. Examples of executable programs include, for example, a compiled program that can be translated into a machine code format and loaded into a random access portion of the memory 704 and executed by the processor 702, source code that can be expressed in an object code format and loaded into a random access portion of the memory 704 and executed by the processor 702, or source code that can be interpreted by another executable program to generate instructions in a random access portion of the memory 704 and executed by the processor 702, etc.

An executable program can be stored in any portion or component of the memory 704 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 704 can include both volatile and nonvolatile memory and data storage components. Volatile components are those that do not retain data values upon loss of power. Nonvolatile components are those that retain data upon a loss of power. Thus, the memory 704 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 702 can be embodied as one or more processors 702 and the memory 704 can be embodied as one or more memories 704 that operate in parallel, respectively, or in combination. Thus, the local interface 706 facilitates communication between any two of the multiple processors 702, between any processor 702 and any of the memories 704, or between any two of the memories 704, etc. The local interface 706 can include additional systems designed to coordinate this communication, including, for example, a load balancer that performs load balancing.

As discussed above, the electronic commerce engine 130 and/or the option optimization engine 140 can be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams in FIG. 6 is representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 702. The machine code can be converted from the source code, etc. Further, each block can represent, or be connected with, a circuit or a number of interconnected circuits to implement a certain logical function or process step.

Although the flowchart or process diagram in FIG. 6 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Also, any logic or application described herein, including the electronic commerce engine 130 and/or the option optimization engine 140 that are embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIG. 6. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying at least one program that, when executed by at least one computing device, directs the at least one computing device to:
   assemble a first offer for a first item hosted for sale by an electronic commerce engine with a first offer for a second item hosted for sale by the electronic commerce engine;
   identify a fulfillment option benefit for which the first offer for the first item contributes to qualification;
   determine whether the first offer for the second item contributes to qualification for the fulfillment option benefit;
   in response to a determination that the first offer for the second item does not contribute to qualification for the fulfillment option benefit, search for a second offer for the second item which contributes to qualification for the fulfillment option benefit using an item optimization engine;

calculate a difference between the first offer for the second item and the second offer for the second item; and generate a qualification contribution notification for the second offer for the second item including an indication of the difference.

2. The non-transitory computer-readable medium of claim 1, wherein the fulfillment option benefit comprises at least one of a delivery timeframe, delivery option, shipping service class, shipping cost reduction, or packaging option benefit.

3. The non-transitory computer-readable medium of claim 1, wherein a qualification threshold for the fulfillment option benefit comprises at least one of a threshold quantity, a threshold cost, a threshold volume, a threshold weight, or a threshold order frequency to qualify for the fulfillment option benefit.

4. A method, comprising:

identifying, by at least one computing device, a fulfillment option benefit for which a first item contributes to qualification;

identifying, by the at least one computing device, a first offer for a second item which does not contribute to qualification for the fulfillment option benefit;

auditing, by the at least one computing device, a plurality of other offers for the second item using an item optimization engine to determine whether a second offer for the second item contributes to qualification for the fulfillment option benefit; and generating, by the at least one computing device, a qualification contribution notification for the second offer for the second item in response to a determination that the second offer for the second item contributes to qualification for the fulfillment option benefit.

5. The method of claim 4, further comprising calculating, by the at least one computing device, a difference in at least one attribute between the first offer for the second item and the second offer for the second item.

6. The method of claim 5, wherein the qualification contribution notification includes an indicator of the difference.

7. The method of claim 4, wherein auditing the plurality of other offers for the second item comprises determining, by the at least one computing device, a subset of the plurality of other offers for the second item which contribute to qualification for the fulfillment option benefit.

8. The method of claim 7, further comprising ranking at least one offer in the subset based at least in part on an interaction history to identify a preference for the second offer for the second item.

9. The method of claim 4, further comprising:

determining that no other offer for the second item contributes to qualification for the fulfillment option benefit; and in response to determining that no other offer for the second item contributes to qualification for the fulfillment option benefit, identifying at least one offer for a third item which contributes to qualification for the fulfillment option benefit.

10. The method of claim 4, further comprising:

identifying, by at least one computing device, a second fulfillment option benefit for which the second item contributes to qualification; and searching, by the at least one computing device, for a second offer for the first item that contributes to qualification for the second fulfillment option benefit.

11. The method of claim 4, wherein the fulfillment option benefit comprises at least one of a delivery timeframe, delivery option, shipping service class, shipping cost reduction, or packaging option benefit.

12. The method of claim 4, wherein a qualification threshold for the fulfillment option benefit comprises at least one of a threshold quantity, a threshold cost, a threshold volume, a threshold weight, or a threshold order frequency to qualify for the fulfillment option benefit.

13. A system, comprising:

a memory device to store computer-readable instructions thereon; and at least one computing device configured through execution of the computer-readable instructions to:

identify a first offer for a second item which does not contribute to qualification for a fulfillment option benefit along with a first item in an electronic shopping cart;

determine a second offer for the second item which does contribute to qualification for the fulfillment option benefit using an item optimization engine; and generate a qualification contribution notification for the second offer for the second item.

14. The system of claim 13, wherein:

the at least one computing device is further configured to calculate a difference in at least one attribute between the first offer for the second item and the second offer for the second item; and the qualification contribution notification includes an indicator of the difference.

15. The system of claim 13, wherein the at least one computing device is further configured to determine a plurality of other offers for the second item which contribute to qualification for the fulfillment option benefit.

16. The system of claim 15, wherein the at least one computing device is further configured to rank the plurality of other offers for the second item based at least in part on an interaction history to identify a preference for the second offer for the second item.

17. The system of claim 13, wherein the at least one computing device is further configured to identify at least one offer for a third item which contributes to the qualification for the fulfillment option benefit.

18. The system of claim 13, wherein the at least one computing device is further configured to:

identify a second fulfillment option benefit for which the second item contributes to qualification for; and audit a plurality of other offers for the first item to determine whether a second offer for the first item contributes to qualification for the second fulfillment option benefit.

19. The system of claim 13, wherein the fulfillment option benefit comprises at least one of a delivery timeframe, delivery option, shipping service class, shipping cost reduction, or packaging option benefit.

20. The system of claim 13, wherein a qualification threshold for the fulfillment option benefit comprises at least one of a threshold quantity, a threshold cost, a threshold volume, a threshold weight, or a threshold order frequency to qualify for the fulfillment option benefit.

* * * * *